US009653051B2

(12) United States Patent
Adachi

(10) Patent No.: US 9,653,051 B2
(45) Date of Patent: May 16, 2017

(54) WIND INSTRUMENT BELL, WIND INSTRUMENT AND RING

(71) Applicant: Yamaha Corporation, Hamamatsu-Shi, Shizuoka-Ken (JP)

(72) Inventor: Hiraku Adachi, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 14/453,859

(22) Filed: Aug. 7, 2014

(65) Prior Publication Data

US 2015/0040738 A1 Feb. 12, 2015

(30) Foreign Application Priority Data

Aug. 9, 2013 (JP) ................................ 2013-167066

(51) Int. Cl.
*G01D 9/00* (2006.01)
*G10D 7/06* (2006.01)

(52) U.S. Cl.
CPC .................................... *G10D 7/066* (2013.01)

(58) Field of Classification Search
USPC ........................................................... 84/382
See application file for complete search history.

(56) References Cited

U.S. PATENT DOCUMENTS 2,328,574 A * 9/1943 Mueller ................... G10D 7/00 84/380 R
3,635,117 A * 1/1972 Nagao ...................... G10D 7/00 156/257
3,748,946 A * 7/1973 Runde ...................... G10D 7/00 16/109
5,780,757 A 7/1998 Valtchev et al.
6,060,654 A * 5/2000 Valtchev .................. G10D 9/00 84/380 R
6,470,538 B2 * 10/2002 Richter ................... F16L 23/06 24/271
8,304,640 B1 11/2012 Barnfield et al.
2009/0013852 A1 1/2009 Perry

FOREIGN PATENT DOCUMENTS

JP B-45-014835 5/1970
JP UM-A-48-096931 11/1973
JP UM-B-48-042165 12/1973
JP UM-B-51-048266 11/1976
(Continued)

OTHER PUBLICATIONS

European Search Report issued for EP 14 17 9825, mailing date Nov. 11, 2014.
(Continued)

*Primary Examiner* — Christopher Uhlir
(74) *Attorney, Agent, or Firm* — Blank Rome LLP

(57) ABSTRACT

A wind instrument bell includes a bell body and a ring. The bell body has a cylindrical shape, is configured to be connected to a wind instrument body, and has an outer circumferential surface having a recessed groove extending in a circumferential direction of the outer circumferential surface. The ring has a C shape, has a first end and a second end being separated from each other, and is accommodated in the recessed groove in a state of being deformed so that the first and second ends separate from each other.

7 Claims, 9 Drawing Sheets

(56) References Cited

FOREIGN PATENT DOCUMENTS

| | | | |
|---|---|---|---|
| JP | A-02-181787 | | 7/1990 |
| JP | H11-249645 | A | 9/1999 |
| JP | A-2003-084756 | | 3/2003 |
| JP | A-2003-337583 | | 11/2003 |
| KR | 1020090061932 | A | 6/2009 |

OTHER PUBLICATIONS

Office Action from Japanese Patent Application No. 2013-167066 dated Nov. 29, 2016.
Office Action from corresponding Chinese Patent Application No. 201410386495.6 mailed Jan. 25, 2017 with English translation of part Search Report.

* cited by examiner

WIND INSTRUMENT BELL, WIND INSTRUMENT AND RING

BACKGROUND OF THE INVENTION

Field of the Invention

The present invention relates to a wind instrument bell, a wind instrument, and a ring.

Priority is claimed on Japanese Patent Application No. 2013-167066, filed Aug. 9, 2013, the content of which is incorporated herein by reference.

Description of Related Art

Generally, wind instruments such as clarinets, oboes, and bassoons have a bell for sound radiation (wind instrument bell) at the distal end of the wind instrument body (for example, refer to Japanese Unexamined Patent Application, First Publication No. H11-249645). Also, there is a wind instrument bell in which a metal ring that is formed in a ring shape is fixed to the outer circumference of the bell body. Conventionally, when fixing the ring to the bell body, for example a projection is formed on the inner circumferential surface of the ring, and the projection of the ring is fitted and fastened to the outer circumferential surface of the bell body.

However, in the aforementioned conventional wind instrument bell, there is the problem of it being difficult to remove the ring from the bell body. Also, in the case of the bell body being made of wood, when the bell body contracts due to drying, there is the risk of the mounting state of the ring with respect to the bell body becoming loose.

SUMMARY OF THE INVENTION

The present invention has been achieved in view of the aforementioned circumstances. An object of the present invention is to provide a wind instrument bell in which a ring can be easily attached/detached to/from the bell body, a wind instrument that includes it, and a ring that is used for a wind instrument bell.

A wind instrument bell according to a first aspect of the present invention includes: a bell body that has a cylindrical shape, the bell body being configured to be connected to a wind instrument body, the bell body having an outer circumferential surface, the outer circumferential surface having a recessed groove extending in a circumferential direction of the outer circumferential surface; and a ring that has a C shape, the ring having a first end and a second end being separated from each other, the ring being accommodated in the recessed groove in a state of being deformed so that the first and second ends separate from each other.

A wind instrument according to a second aspect of the present invention includes: a wind instrument body that has a cylindrical shape and includes a plurality of keys arranged on an outer circumferential surface thereof; and the wind instrument bell described above, the wind instrument bell being connected to the wind instrument body.

A ring according to a third aspect of the present invention is a ring for a bell body, the bell body having a cylindrical shape, the bell body being configured to be connected to a wind instrument body, the bell body having an outer circumferential surface, the outer circumferential surface having a recessed groove extending in a circumferential direction of the outer circumferential surface. The ring includes: a ring body that has a C shape, the ring body having a first end and a second end being separated from each other. The ring body is accommodated in the recessed groove in a state of being deformed so that the first and second ends separate from each other.

According to the wind instrument bell, the wind instrument, and the ring according to the aspects of the present invention, since the ring (ring body) has a C shape, by causing the ring to undergo deformation (plastic deformation or resilient deformation) so that the first end and the second end separate from each other, it is possible to easily attach/detach the ring (ring body) to/from the bell body.

DETAILED DESCRIPTION OF THE INVENTION

[First Embodiment]

Hereinbelow, a first embodiment of the present invention shall be described with reference to FIGS. 1 to 6.

Figure 1:
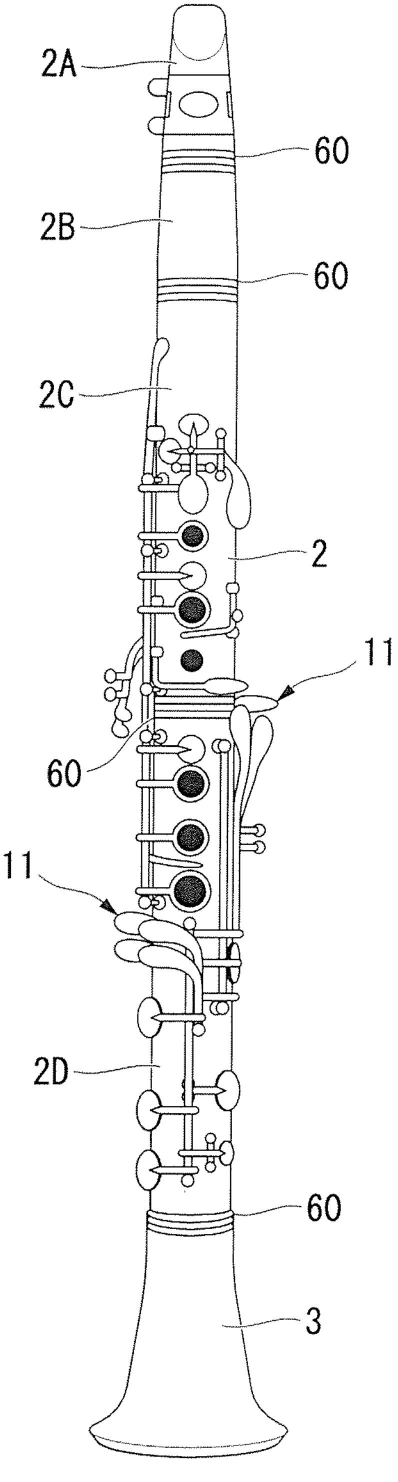
FIG. 1 is a front elevational view of a wind instrument according to a first embodiment of the present invention.

As shown in FIG. 1, a wind instrument 1 according to this embodiment is a clarinet, which is one type of woodwind instrument. The wind instrument 1 includes a main tube part (wind instrument body) 2, and a bell part (wind instrument bell) 3. The main tube part 2 includes a plurality of keys 11 that are arranged on the outer circumferential surface. The bell part 3 is provided at one end of the main tube part 2. The main tube part 2 may be constituted from a mouthpiece 2A, a barrel 2B, an upper joint 2C and a lower joint 2D which are conventionally known. The mouthpiece 2A, the barrel 2B, the upper joint 2C and the lower joint 2D are arranged in sequence in the axial direction of the main tube part 2 and connected.

Figure 2:
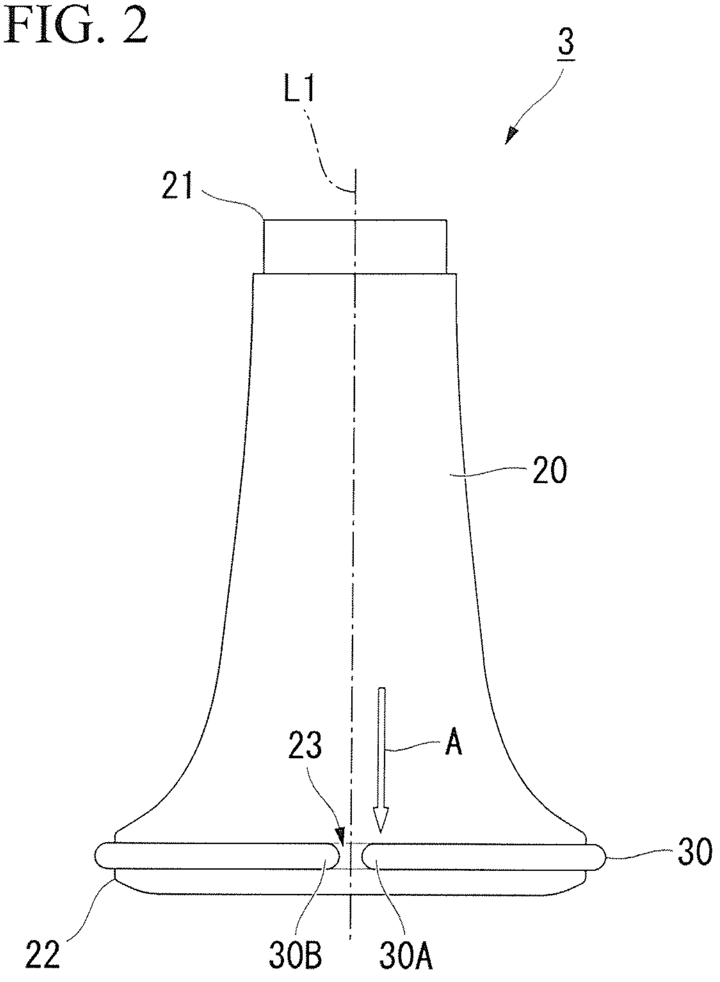
FIG. 2 is a front elevational view of a wind instrument bell that constitutes the wind instrument of FIG. 1.
Figure 3:
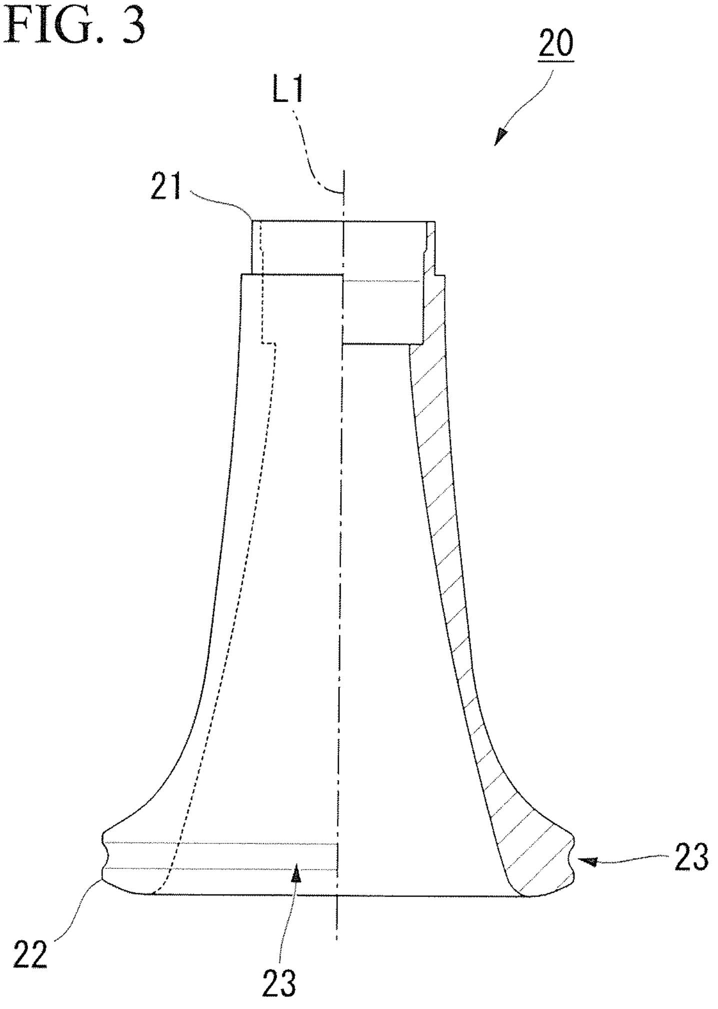
FIG. 3 is a half sectional view of the bell body that constitutes the wind instrument bell of FIG. 2.

As shown in FIGS. 2 and 3, the bell part 3 includes a bell body 20 that is formed to be cylindrical, and a ring 30 that is provided on the outer circumferential surface of the bell body 20.

The bell body 20 may for example be made of wood or resin. The bell body 20 includes a connection end portion 21 at one end in an axial line L1 direction of the bell body 20. The connection end portion 21 is used for connecting the bell body 20 to one end of the main tube part 2 (the lower joint). The bell body 20 includes an open end portion 22 at the other end in the axial line L1 direction. The open end portion 22 propagates the sound of the wind instrument 1 to the outside. The bell body 20 of the present embodiment is capable of being attached to and detached from the main tube part 2. This bell body 20 is formed to be a tapered tube in which the inner diameter and outer diameter thereof increase in a rounded manner. The inner diameter and outer diameter of the bell body 20 are a maximum at the open end portion 22. Moreover, the outer circumferential surface of the bell body 20 of the present embodiment may for example be flatly formed along the axial line L1 of the bell body 20, so that the outer diameter dimension of the bell body 20 is uniform at the open end portion 22.

Figure 5:
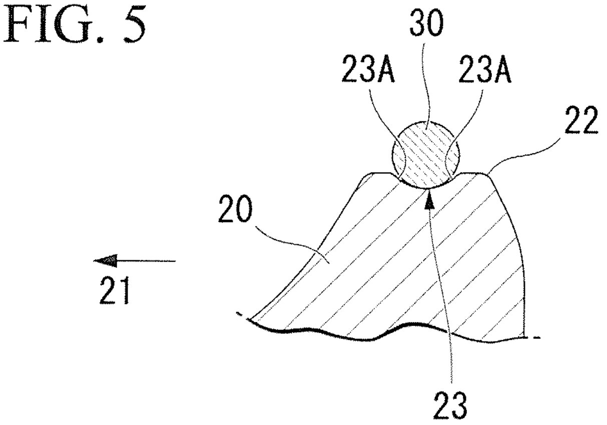
FIG. 5 is an enlarged cross-sectional view of main portions of the wind instrument bell of FIG. 2.

A recessed groove 23 that accommodates the ring 30 described below is formed on the outer circumferential surface of the bell body 20 to extend along the circumferential direction thereof. As shown in FIGS. 3 and 5, the recessed groove 23 is formed in a cross-sectional arc shape in a transection that includes the axial line L1. In this embodiment, the inner surface of the recessed groove 23 is formed to be an arc that is less than a semicircle (minor arc). That is to say, the inner surface of the recessed groove 23 of the present embodiment has a sloping surface 23A that slopes so as to head from one edge in the width direction of the recessed groove 23 along the direction of the axial line L1 to the other edge in the width direction of the recessed groove 23 as it heads toward the inner side of the bell body 20 in the diameter direction. As illustrated in FIG. 5, this sloping surface 23A may be formed at both edges in the width direction of the recessed groove 23. However, it is not limited to this constitution, and the sloping surface 23A may also be formed only at one edge in the width direction of the recessed groove 23 positioned at the open end portion 22 side, in the inner surface of the recessed groove 23.

Figure 4:
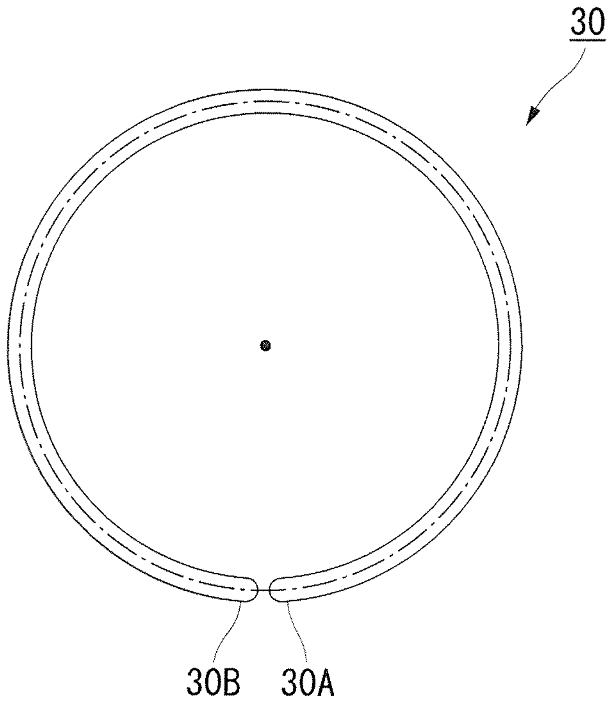
FIG. 4 is a plan view of a ring that constitutes the wind instrument bell of FIG. 2.

In the present embodiment, the ring 30 is made from metal (for example, an alloy of any one or two or more of titanium, iron, copper, gold, silver, zinc, tin, nickel, magnesium, aluminum, and chromium). However, the material of the ring 30 is not limited to metal, and it may also be made from resin or plastic. As shown in FIGS. 2, 4 and 5, the ring 30 is formed in a C-shape in plan view with a portion in the circumferential direction thereof cut out. The ring (ring body) 30 has a one end (first end) 30A and another end (second end) 30B that face each other in the circumferential direction.

The ring 30 is formed so that it deforms when an external force is applied. The ring 30 of the present embodiment is formed to be resiliently deformable, and so when the external force on the ring 30 is released, it reverts to its original shape. The one end 30A and the other end 30B of the ring 30 are formed rounded, that is to say, hemispherical shape. The spacing between the one end 30A and the other end 30B of the ring 30 is preferably small.

The surface of the inner edge side of the ring 30 in the diameter direction is rounded. In the present embodiment, the surface of the outer edge side of the ring 30 in the diameter direction is also rounded. That is to say, the cross section of the ring 30 in the circumferential direction has a circular shape, as shown in FIG. 5.

The cross-sectional radial dimension in the circumferential direction of the ring 30 that is formed in a circular shape is set to be greater than the depth dimension of the recessed groove 23. In other words, the depth dimension of the recessed groove 23 is equal to or less than half of the thickness dimension along the diameter direction of the ring 30. For this reason, in the state of the ring 30 being attached to the bell body 20, only the portion of the ring 30 on the inner edge side in the diameter direction is accommodated in the recessed groove 23, with the portion of the ring 30 on the outer edge side in the diameter direction projecting out from the recessed groove 23.

In the state of the ring 30 being removed from the bell body 20, the inner diameter dimension of the ring 30 is set to be smaller than the outer diameter dimension of the bell body 20 at the base portion of the recessed groove 23. For this reason, in the state of the ring 30 being attached to the bell body 20, the ring 30 biases the one end 30A and the other end 30B in the circumferential direction thereof to approach each other, and the ring 30 is fastened to the bell body 20 by its own resiliency.

Next, in the wind instrument 1 that is constituted in the aforementioned manner, in the case of the ring 30 being attached/detached to/from the bell body 20, the ring 30 need only be deformed so that the one end 30A and the other end 30B of the ring 30 mutually separate.

Described in concrete terms, in the event of attaching the ring 30 to the bell body 20, first the one end 30A (or the other end 30B) in the circumferential direction of the ring 30 is accommodated in the recessed groove 23 of the bell body 20. Next, the portion that leads to the one end 30A (or the other end 30B) of the ring 30 in the circumferential direction is little by little moved toward the connection end portion 21 side of the bell body 20 along the axial line L1 direction, to be little by little accommodated in the recessed groove 23. Finally, the other end 30B (or the one end 30A) of the ring 30 is accommodated. By the above steps, it is possible to attach the ring 30 to the bell body 20.

In this state, the ring 30 biases the one end 30A and the other end 30B in the circumferential direction thereof in a direction to approach each other, and the ring 30 is fastened to the bell body 20 by its own resiliency.

On the other hand, in the event of removing the ring 30 from the bell body 20, first the one end 30A (or the other end 30B) in the circumferential direction of the ring 30 is moved to the open end portion 22 side of the bell body 20 along the axial line L1 direction (the direction shown by the arrow A in FIG. 2) against the biasing force of the ring 30, to put the one end 30A (or the other end 30B) of the ring 30 out from the recessed groove 23. Next, the portion that leads to the one end 30A (or the other end 30B) in the circumferential direction of the ring 30 is little by little moved toward the open end portion 22 side of the bell body 20 along the axial line L1, to be little by little put out from the recessed groove 23. Finally, the other end 30B (or the one end 30A) of the ring 30 is put out from the recessed groove 23. By the above steps, it is possible to remove the ring 30 from the bell body 20.

As described above, according to the wind instrument 1, and the bell part 3 and the ring 30 to be provided in it, the ring 30 is formed in a C shape in plan view. For this reason, by causing the ring 30 to deform (undergo resilient deformation) so that the one end 30A and the other end 30B in the circumferential direction of the ring 30 mutually separate, it is possible to easily attach/detach the ring 30 to/from the bell body 20.

Also, it is possible to easily attach/detach the ring 30 to/from the bell body 20. For this reason, for example, if the bell body 20 is made of wood, even if this bell body 20 contracts due to drying, it is also possible to easily attach another ring 30 to the bell body 20.

Moreover, it is possible to easily attach/detach the ring 30 to/from the bell body 20. For this reason, it is possible to produce two kinds of tone colors with the wind instrument 1 using the same bell body 20, and so it is possible to easily select a tone color in accordance with such as the musical piece being performed. Hereinbelow, a description shall be given using the graph of FIG. 6.

Figure 6:
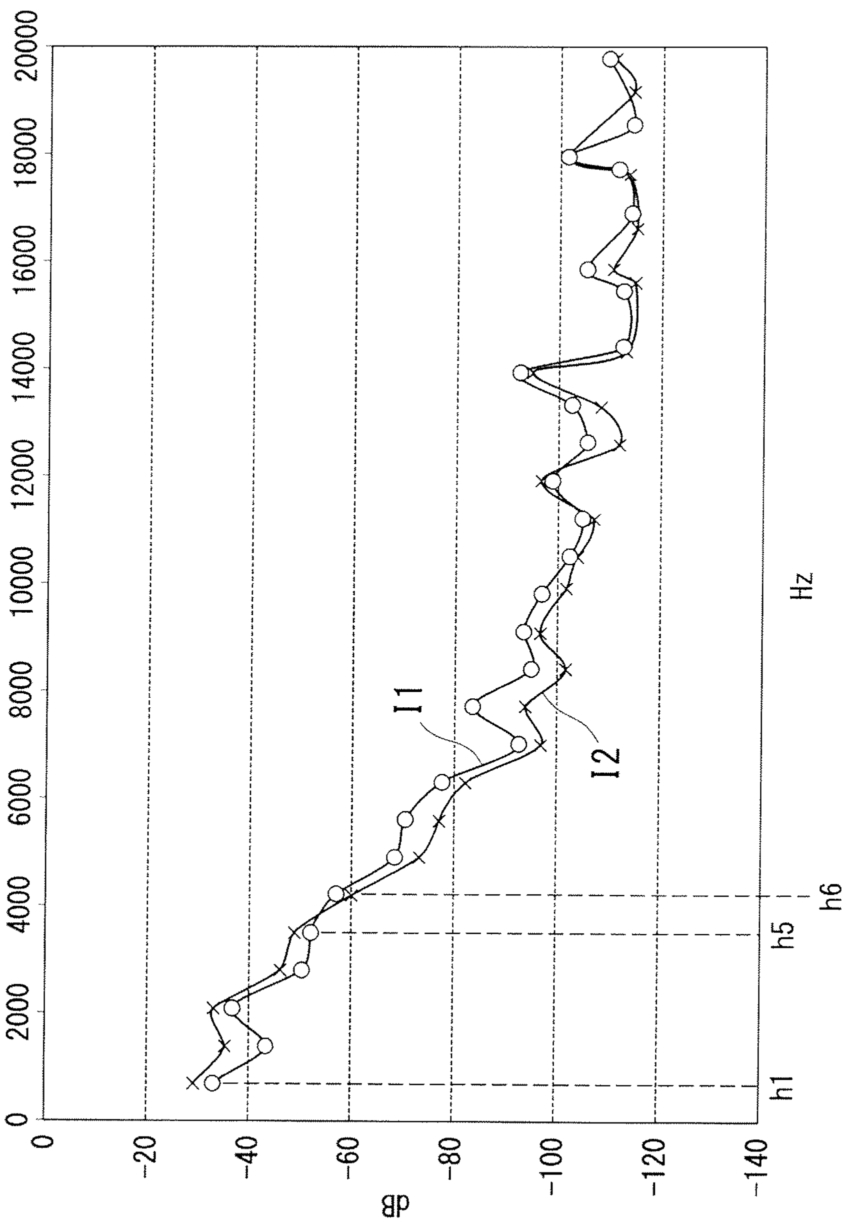
FIG. 6 is a graph that shows the difference in acoustic properties of the wind instrument due to the presence and absence of the ring, in the wind instrument shown in FIG. 1.

The graph of FIG. 6 is the measurement result of the frequency characteristics of the wind instrument 1. The line I1 in FIG. 6 denotes the measurement result in the case of the ring 30 being removed from the bell body 20 (that is, the case of no ring). The line I2 in FIG. 6 denotes the measurement result in the case of the ring 30 being attached to the bell body 20 (that is, the case of the ring being present). In FIG. 6, reference symbol h1 denotes first-order harmonics. The reference symbol h5 denotes fifth-order harmonics. The reference symbol h6 denotes sixth-order harmonics.

According to the graph of FIG. 6, in the case of the ring 30 being removed from the bell body 20, the low-frequency component of the sound (for example, low-order harmonics of the fifth-order and lower) is strong compared with the case where the ring 30 is attached to the bell body 20. Also, in this case, the auditory sensation matches the aforementioned result, with a soft sound being obtained in which the low-order harmonics are dominant.

On the other hand, in the case of the ring 30 being attached to the bell body 20, the high-frequency component of the sound (for example, high-order harmonics of the sixth-order and higher) is strong compared with the case where the ring 30 is removed from the bell body 20. Also, in this case, the auditory sensation matches the aforementioned result, with a bright sound being obtained in which the high-order harmonics are dominant.

That is to say, different tone colors can be perceived between the case of the ring 30 being attached to the bell body 20, and the case of the ring 30 being removed from the bell body 20.

The reason for this kind of result is considered to be that when the ring 30 is removed from the bell body 20, the sound-pressure energy is absorbed by the tube wall of the open end portion 22 of the bell body 20, and in particular damping of the high-frequency component of the sound easily occurs. In contrast, in the state of the ring 30 being attached to the bell body 20, since the rigidity of the tube wall of the open end portion 22 increases, it is considered that the air column oscillations including most of the high-frequency component of the sound are maintained without being attenuated.

Moreover, according to the present embodiment, in the state of the ring 30 being attached to the bell body 20, the ring 30 is fastened to the bell body 20 by its own resiliency. Therefore, it is possible to reliably fix the ring 30 to the outer circumferential surface of the bell body 20.

Also, according to the present embodiment, in the state of the ring 30 being attached to the bell body 20, only the portion of the inner edge side of the ring 30 in the diameter direction is accommodated in the recessed groove 23. For this reason, when attaching/detaching the ring 30 to/from the bell body 20, it is possible to minimize the length in which the one end 30A or the other end 30B in the circumferential direction of the ring 30 is made to move in the diameter direction. Accordingly, it is possible to attach/detach the ring 30 to/from the bell body 20 more easily.

Furthermore, according to the present embodiment, the inner surface of the recessed groove 23 has the sloping surface 23A. For this reason, when attaching/detaching the ring 30 to/from the bell body 20, the one end 30A or the other end 30B in the circumferential direction of the ring 30 need only be made to move along the sloping surface 23A. Accordingly, it is possible to attach/detach the ring 30 to/from the recessed groove 23 more easily.

Also, according to the present embodiment, the surface of the inner edge side of the ring 30 in the diameter direction as well as the one end 30A and the other end 30B of the ring 30 are rounded. For this reason, when attaching/detaching the ring 30 to/from the bell body 20, it is possible to prevent the outer circumferential surface of the bell body 20 from being damaged by the ring 30.

In the present embodiment, by the ring 30 being fastened to the bell body 20 with its own resiliency, it is possible to reliably fix the ring 30 to the outer circumferential surface of the bell body 20. Note that in the event of attaching/detaching the ring 30 with respect to the bell body 20, the ring 30 need only be resiliently deformed so that the one end and the other end in the circumferential direction of the ring 30 mutually separate against the biasing force of the ring 30.

In the present embodiment, when attaching/detaching the ring 30 to/from the bell body 20, since it is possible to minimize the length in which the one end or the other end in the circumferential direction of the ring 30 is made to move in the diameter direction, it is possible to attach/detach it more easily.

[Second Embodiment]

Next, a second embodiment of the present invention shall be described with reference to FIGS. 7 to 9.

A bell body 40 of the second embodiment differs from the bell body 20 of the first embodiment. The other constitutions of the second embodiment are the same as the first embodiment. In the present embodiment, the constituent elements that are the same as in the first embodiment are denoted by the same reference symbols, with descriptions thereof being omitted.

Figure 7:
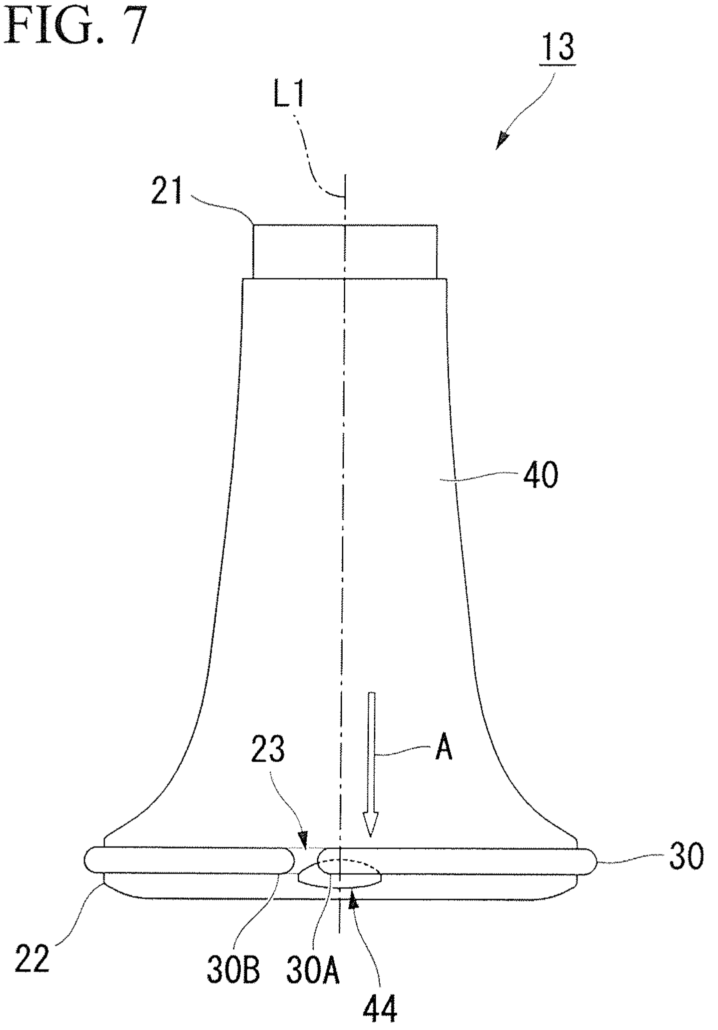
FIG. 7 is a front elevational view of a wind instrument bell according to a second embodiment of the present invention.
Figure 8:
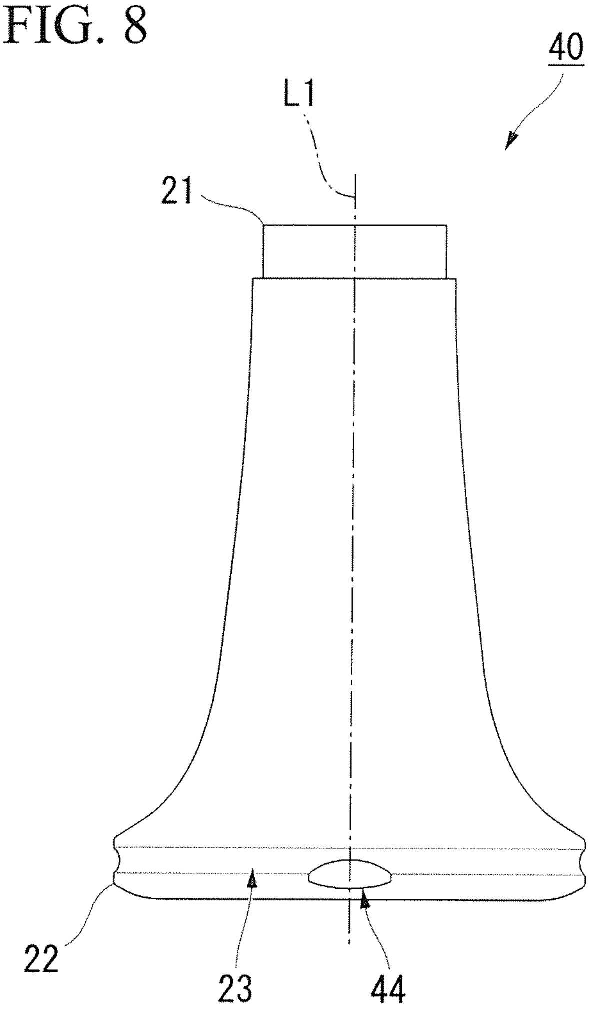
FIG. 8 is a front elevational view of a bell body that constitutes the wind instrument bell of FIG. 7.
Figure 9:
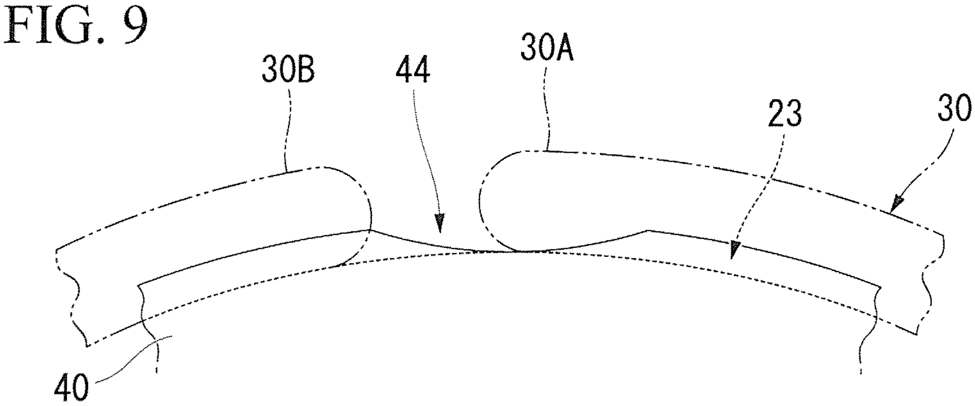
FIG. 9 is an enlarged cross-sectional view of main portions of the bell body of FIG. 8.

As shown in FIGS. 7 to 9, a notch 44 that exposes a portion in the circumferential direction of the recessed groove 23 to the outside from the open end portion (the one end portion) 22 of a bell body 40 is formed. The notch 44 is formed so as to sink inward from the outer circumferential surface of the bell body 40 toward to inside in the diameter direction. The depth dimension of the notch 44 is set to be the same as the depth dimension of the recessed groove 23. The inner surface of the notch 44, viewed from the open end portion 22 side as shown in FIG. 9, may be formed for example in a rectangular shape. The inner surface of the notch 44 is more preferably formed in a circular shape as shown for example in FIG. 9.

According to a bell part 13 of the present embodiment, as compared with the bell part 3 of the first embodiment, it is possible to more easily attach/detach the ring 30 to/from the bell body 40.

For example, in the case of attaching the ring 30 to the bell body 40, first when accommodating the one end 30A (or the other end 30B) in the circumferential direction of the ring 30 in the recessed groove 23, the one end 30A (or the other end 30B) of the ring 30 is placed in the recessed groove 23 by passing it through the notch 44 without moving the one end 30A (or the other end 30B) of the ring 30 to the outside in the diameter direction with respect to the other end 30B (or the one end 30A). For this reason, it is possible to easily accommodate the one end 30A (or the other end 30B) of the ring 30 in the recessed groove 23. Note that in the state of the ring 30 being attached to the bell body 40 in this way, as shown in FIG. 9, the one end 30A (or the other end 30B) of the ring 30 is exposed to the outside through the notch 44.

Also, in the case of for example removing the ring 30 from the bell body 40, first, when putting out the one end 30A (or the other end 30B) in the circumferential direction of the ring 30 from the recessed groove 23, the one end 30A (or the other end 30B) of the ring 30 is made to move in the direction of the arrow A shown in FIG. 7 to pass through the notch 44, without moving the one end 30A (or the other end 30B) of the ring 30 to the outside in the diameter direction with respect to the other end 30B (or the one end 30A). By such steps, it is possible to easily put out the one end 30A (or the other end 30B) of the ring 30 from the recessed groove 23.

According to the present embodiment, when attaching/detaching the ring 30 to/from the bell body 40, since it is possible to move the one end 30A (or the other end 30B) of the ring 30 into or out of the recessed groove 23 through the notch 44, it is possible to easily attach/detach the ring 30 to/from the bell body 40.

[Third Embodiment]

Next, a third embodiment of the present invention shall be described with reference to FIG. 10.

A ring 50 of the third embodiment differs from the ring 30 of the first embodiment. The other constitutions of the third embodiment are the same as the first embodiment.

Figure 10:
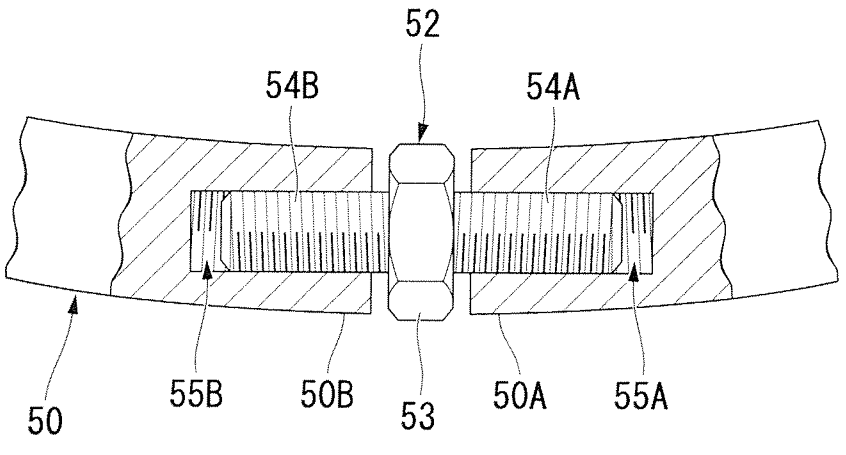
FIG. 10 is an enlarged cross-sectional view of main portions of a ring that is provided in a wind instrument bell according to a third embodiment of the present invention.

As shown in FIG. 10, the ring 50 of this embodiment includes an adjusting screw 52 that couples one end 50A and the other end 50B in the circumferential direction thereof, and adjusts the spacing between the one end 50A and the other end 50B. The adjusting screw 52 includes a plate-shaped actuating portion 53, and a pair of male threaded portions 54A and 54B that project in mutually opposite directions from the actuating portion 53.

The pair of male threaded portions 54A and 54B are arranged on the same axial line. One of the pair of the male threaded portions 54A and 54B is right-hand threaded, while the other is left-hand threaded. Screw-thread holes 55A and 55B corresponding to the male threaded portions 54A and 54B, respectively, are formed in the one end 50A and the other end 50B in the circumferential direction of the ring 50. The pair of male threaded portions 54A and 54B are screwed into the screw-thread holes 55A and 55B, respectively.

The actuating portion 53 is a part that rotates the pair of male threaded portions 54A and 54B about the axial line thereof by for example the fingers of an operator or a simple tool such as a spanner. The actuating portion 53 is arranged between the one end 50A and the other end 50B of the ring 50. The actuating portion 53 may be formed in the shape of a regular polygonal column as shown for example in FIG. 10, or may be formed for example in an arbitrary cylindrical shape with knurling performed on the outer circumferential surface of the actuating portion 53.

The ring 50 that is constituted in the above manner may be formed to be resiliently deformable similarly to the first and second embodiments, but may also be formed to be for example plastically deformable.

In the ring 50 of the above-mentioned present embodiment, when the adjusting screw 52 is rotated in one rotation direction, the ring 50 deforms so that the spacing between the one end 50A and the other end 50B of the ring 50 may spread. In this case, the inner diameter dimension of the ring 50 increases. Also, when the adjusting screw 52 is rotated in the other direction about its axis, the ring 50 deforms so that the spacing between the one end 50A and the other end 50B of the ring 50 narrows. In this case, the inner diameter dimension of the ring 50 decreases.

According to the present embodiment, by adjusting the spacing between the one end 50A and the other end 50B of the ring 50 in the circumferential direction thereof by the adjusting screw 52, since the inner diameter dimension of the ring 50 changes, it is possible to more easily attach/detach the ring 50 to/from the bell body 40 compared to the bell part 3 of the first embodiment.

For example, when attaching the ring 50 to the bell body 40, by operating the actuating portion 53 in advance, the inner diameter dimension of the ring 50 is made greater than the external diameter dimension of the bell body 40. Then, in the state of the ring 50 being arranged on the outer side of the recessed groove 23 in the diameter direction, just by reducing the inner diameter dimension of the ring 50 by operating the actuating portion 53, it is possible to accommodate the ring 50 in the recessed groove 23, and it is possible to fasten and fix the ring 50 to the bell body 40.

According to the present embodiment, by adjusting the spacing between the one end 50A and the other end 50B in the circumferential direction of the ring 50 by the adjusting screw 52, since the inner diameter dimension of the ring 50 changes, it is possible to more easily attach/detach the ring 50 to/from the bell body 40.

While the embodiments of the invention have been described and illustrated above, the present invention is not limited to the above embodiments. Various modifications can be made without departing from the scope of the present invention.

Figure 11:
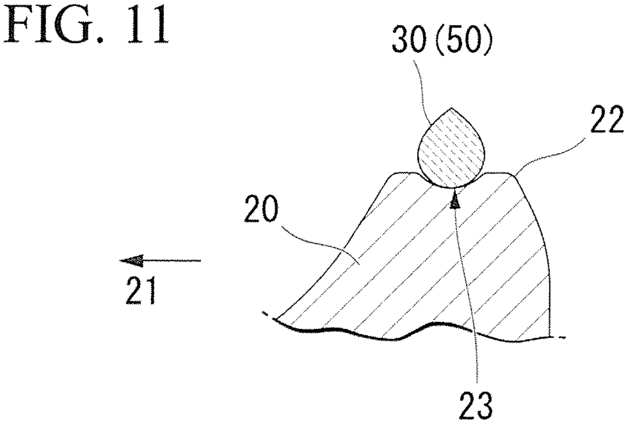
FIG. 11 is an enlarged cross-sectional view of main portions of a wind instrument bell according to another embodiment of the present invention.

For example, in the aforementioned embodiments, while the circumferential direction cross sections of the rings 30 and 50 are formed in a circular shape, they are not limited thereto. At least the surface of the inner edge side of the rings 30 and 50 in the diameter direction need be rounded. The circumferential direction cross section of the rings 30 and 50 may also be formed in a teardrop shape in which the surface of the inner edge side of the ring 50 in the diameter direction is formed in an arc-like shape, as shown for example in FIG. 11.

Also, for example the circumferential direction cross sections of the rings 30 and 50 may be formed in a polygonal shape, with the corner portions positioned on the inner edge side of the rings 30 and 50 in the diameter direction being rounded. Even with these constitutions, when attaching/detaching the rings 30 and 50 to/from the bell bodies 20 and 40, it is possible to prevent damage to the outer circumferential surface of the bell bodies 20 and 40 similarly to the case of the aforementioned embodiments.

Also, in the aforementioned embodiments, descriptions have been given for the case of the rings 30 and 50 being provided on the outer circumferential surface of the bell body 20. However, it is not limited thereto. The embodiments can also be applied to a harness (ring) 60 (refer to FIG. 1) that is for example made of metal and formed in a ring shape. The harness 60 is provided on the outer circumferential surface of the connection portions of the mouthpiece 2A, the barrel 2B, the upper joint 2C, the lower joint 2D and the bell part 3, which are components of the wind instrument 1.

Moreover, in the aforementioned embodiments, descriptions have been given for the case of the rings 30 and 50 being applied to a clarinet. It is not limited thereto. The rings 30 and 50 may also be applied to other wind instruments. Examples of other wind instruments include woodwinds such as the oboe, the bassoon and the recorder.

What is claimed is:

1. A wind instrument bell comprising:

a bell body that has a cylindrical shape, the bell body being configured to be connected to a wind instrument body, the bell body having an outer circumferential surface, the outer circumferential surface having a recessed groove facing radially outwardly, and extending in a circumferential direction of the outer circumferential surface; and a ring that has a C shape, the ring having a first end and a second end being separated from each other, the ring being accommodated in the recessed groove in a state of being deformed so that the first and second ends separate from each other;

wherein the ring is resiliently deformable;

wherein, in a state of the ting being fastened to the bell body, the ring is biased inwardly toward the recessed groove so as to be accommodated in the recessed groove, such that an outer surface of the ring is an outer surface of a wind instrument, where the wind instrument comprises the wind instrument bell and wind instrument body; and wherein, in a state of the ring being removed from the bell body, an inner diameter dimension of the ring is smaller than an outer diameter dimension of the bell body at a base portion of the recessed groove.

2. The wind instrument bell according to claim 1, wherein the ring includes an adjusting screw, and the adjusting screw couples the first and second ends, and adjusts a spacing between the first and seconds ends.

3. The wind instrument bell according to claim 1, wherein the ring includes metal, and the metal includes any one of titanium, iron, copper, gold, silver, zinc, tin, nickel, magnesium, aluminum, and chromium.

4. A wind instrument comprising: a wind instrument body that has a cylindrical shape and includes a plurality of keys arranged on an outer circumferential surface thereof; and the wind instrument bell according to claim 1, the wind instrument bell being connected to the wind instrument body.

5. A wind instrument component comprising:

a main body that has a cylindrical shape, the main body having an outer circumferential surface, the outer circumferential surface having a recessed groove facing radially outwardly, and extending in a circumferential direction of the outer circumferential surface; and a ring that has a C shape, the ring having a first end and a second end being separated from each other, the ring being accommodated in the recessed groove in a state of being deformed so that the first and second ends separate from each other;

wherein the ring is resiliently deformable;

wherein, in a state of the ting being fastened to the bell body, the ring is biased inwardly toward the recessed groove so as to be accommodated in the recessed groove, such that an outer surface of the ring is an outer surface of a wind instrument, where the wind instrument comprises the wind instrument bell and wind instrument body; and wherein, in a state of the ring being removed from the main body, an inner diameter dimension of the ring is smaller than an outer dimension of the main body at a base portion of the recessed groove.

6. The wind instrument bell according to claim 1, wherein the ring is in contact with the base portion of the recessed groove.

7. The wind instrument component according to claim 5, wherein the ring is in contact with the base portion of the recessed groove.

* * * * *